(12) United States Patent
Akmal et al.

(10) Patent No.: US 10,645,084 B2
(45) Date of Patent: May 5, 2020

(54) TOLL-FREE DATA SIMULATION VIA AN HTTP CONNECT TUNNEL

(71) Applicant: Verizon Patent and Licensing Inc., Arlington, VA (US)

(72) Inventors: Mohammad Zohaib Akmal, Framingham, MA (US); Jian Huang, Sudbury, MA (US); Fnu Bongu Huma Shankar Rao, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 519 days.

(21) Appl. No.: 15/378,725

(22) Filed: Dec. 14, 2016

(65) Prior Publication Data
US 2018/0167295 A1    Jun. 14, 2018

(51) Int. Cl.
*H04L 12/26* (2006.01)
*H04L 29/08* (2006.01)
*H04L 12/46* (2006.01)
*H04L 12/14* (2006.01)
*H04L 29/06* (2006.01)
(Continued)

(52) U.S. Cl.
CPC .......... *H04L 63/10* (2013.01); *H04L 12/1471* (2013.01); *H04L 12/1475* (2013.01); *H04L 12/1496* (2013.01); *H04L 12/4633* (2013.01); *H04L 67/02* (2013.01); *H04L 67/28* (2013.01); *H04L 67/32* (2013.01); *H04M 15/08* (2013.01); *H04M 15/41* (2013.01);
(Continued)

(58) Field of Classification Search
CPC . H04L 67/02; H04L 12/4633; H04L 12/1475; H04L 12/1496; H04L 67/28; H04L 67/32; H04L 12/1471; H04L 63/10; H04M 15/857; H04M 15/08; H04M 15/41; H04M 15/8083; H04M 15/83; H04M 15/84
See application file for complete search history.

(56) References Cited

U.S. PATENT DOCUMENTS

| | | | | |
|---|---|---|---|---|
| 2015/0334543 | A1* | 11/2015 | Yin | H04L 29/12 455/414.1 |
| 2015/0379579 | A1* | 12/2015 | Chiang | G06Q 30/0267 705/14.64 |
| 2018/0069878 | A1* | 3/2018 | Martini | H04L 61/1511 |

OTHER PUBLICATIONS

Wikipedia, "HTTP tunnel," https://en.wikipedia.org/wiki/HTTP_tunnel, Nov. 1, 2016, 3 pages.
(Continued)

*Primary Examiner* — Abdulkader M Alriyashi

(57) ABSTRACT

A device may receive, from a user device, a hypertext transfer protocol (HTTP) CONNECT request that includes a uniform resource locator (URL). The device may determine, using a data structure, whether the URL is a sponsored URL or a non-sponsored URL. The data structure may include one or more sponsored URLs associated with a toll-free data service campaign. The device may establish an HTTP CONNECT tunnel for transferring traffic, associated with the URL, between the user device and another device. The device may monitor data use, associated with the HTTP CONNECT tunnel, based on determining whether the URL is a sponsored URL or a non-sponsored URL. The device may generate a traffic information record based on monitoring the data use, and the device may provide the traffic information record to the user device.

20 Claims, 6 Drawing Sheets

(51) Int. Cl.
*H04M 15/00* (2006.01)
*H04M 15/08* (2006.01)

(52) U.S. Cl.
CPC ....... *H04M 15/8083* (2013.01); *H04M 15/83* (2013.01); *H04M 15/84* (2013.01); *H04M 15/857* (2013.01)

(56) References Cited

OTHER PUBLICATIONS

Khare et al., "Upgrading to TLS Within HTTP/1.1," http://www.ietf.org/rfc/rfc2817.txt, May 2000, 12 pages.

* cited by examiner

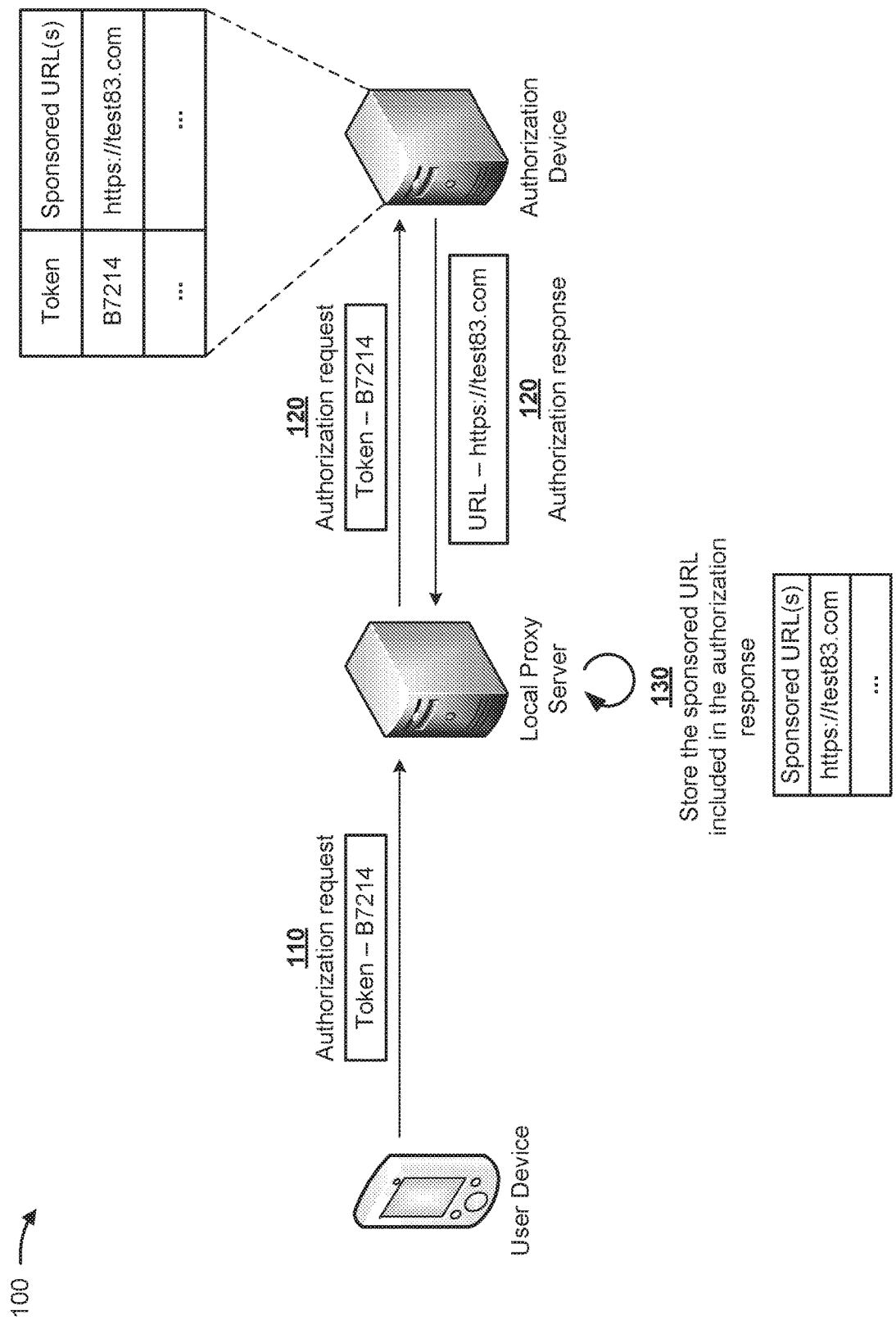

TOLL-FREE DATA SIMULATION VIA AN HTTP CONNECT TUNNEL

BACKGROUND

A toll-free telephone number may refer to a special telephone number that is free for the calling party, with the cost of the call instead being applied to an account of a party sponsoring the call. Similarly, a toll-free data service may refer to a network service where a network operator updates an account of a campaign owner that sponsors the toll-free data service, rather than updating an account of an end user that uses the toll-free data service.

BRIEF DESCRIPTION OF THE DRAWINGS

FIGS. 1A-1C are diagrams of an overview of an example implementation described herein;

DETAILED DESCRIPTION OF PREFERRED EMBODIMENTS

Figure 1B:
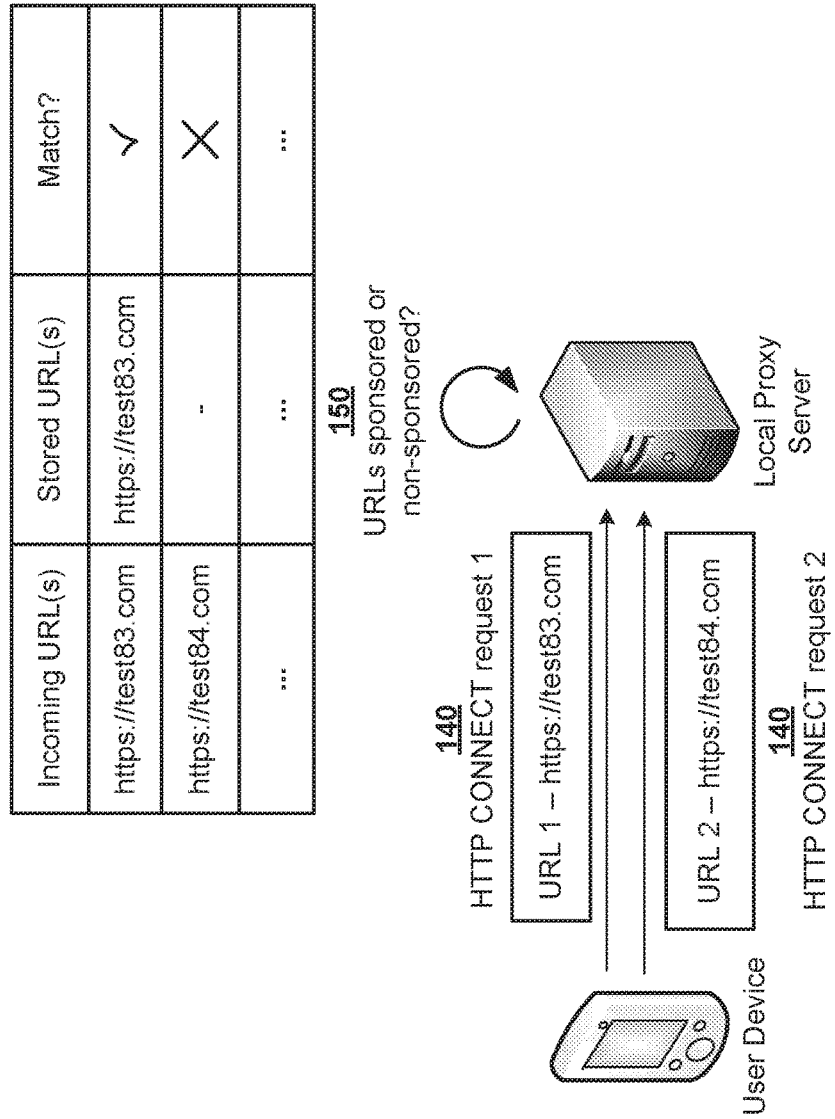

The following detailed description of example implementations refers to the accompanying drawings. The same reference numbers in different drawings may identify the same or similar elements.

A campaign owner (e.g., a content provider, a venue manager or owner, etc.) may create a toll-free data service campaign (e.g., hereinafter referred to as a campaign) to sponsor network content by subsidizing the cost of data use for network users. The campaign may be associated with an account that is updated (e.g., charged) when data use occurs. In some cases, a campaign owner, such as a content provider, may simulate data use in a restricted operating system environment (e.g., in a sandbox environment) to test whether data use during a campaign causes an accurate and corresponding update to an account of the content provider (e.g., correctly charges the content provider for data use of users). To test data use in a sandbox environment, the content provider may send and/or receive communications between a user device (e.g., a device owned by the content provider that simulates user access to content) and a content provider device by establishing a hypertext transfer protocol (HTTP) tunnel using an HTTP proxy server.

Specifically, a user device may send a request for content (e.g., an HTTP GET request, an HTTP CONNECT request, etc.) to an HTTP proxy server, and the HTTP proxy server may send the request to a content provider device that hosts the content. For an HTTP GET request, the HTTP proxy server may differentiate between sponsored (e.g., toll-free) and non-sponsored (e.g., non-toll-free) traffic by examining a uniform resource locator (URL) associated with the GET request to determine if the URL includes an identifier that indicates that the traffic is sponsored (e.g., sponsored traffic may have a signature appended to the end of the URL). In some cases, such as when traffic is sent and/or received using a secure sockets layer (SSL) connection (e.g., testing in a restricted sandbox environment), a user device may send an HTTP CONNECT request to the HTTP proxy server, and the HTTP proxy server may assist in establishing an HTTP CONNECT tunnel between the user device and the content provider device (e.g., using the HTTP proxy server as an intermediary). However, the HTTP CONNECT request may not include a signature appended to the URL due to a format of messages sent using the HTTP CONNECT request, so the HTTP proxy server may be unable to differentiate between sponsored traffic and non-sponsored traffic sent via an HTTP CONNECT tunnel.

Implementations described herein provide a way for an HTTP proxy server to differentiate between sponsored traffic and non-sponsored traffic when sending and/or receiving traffic via an HTTP CONNECT tunnel. By accurately identifying sponsored and non-sponsored traffic via an HTTP CONNECT tunnel, the HTTP proxy server provides a content provider with a tool for verifying the accuracy of campaigns. In this way, the HTTP proxy server prevents data sponsorship errors from occurring when the campaigns are deployed, thereby conserving processing resources and network resources that may otherwise be allocated to correct errors associated with the campaigns.

Figure 1C:
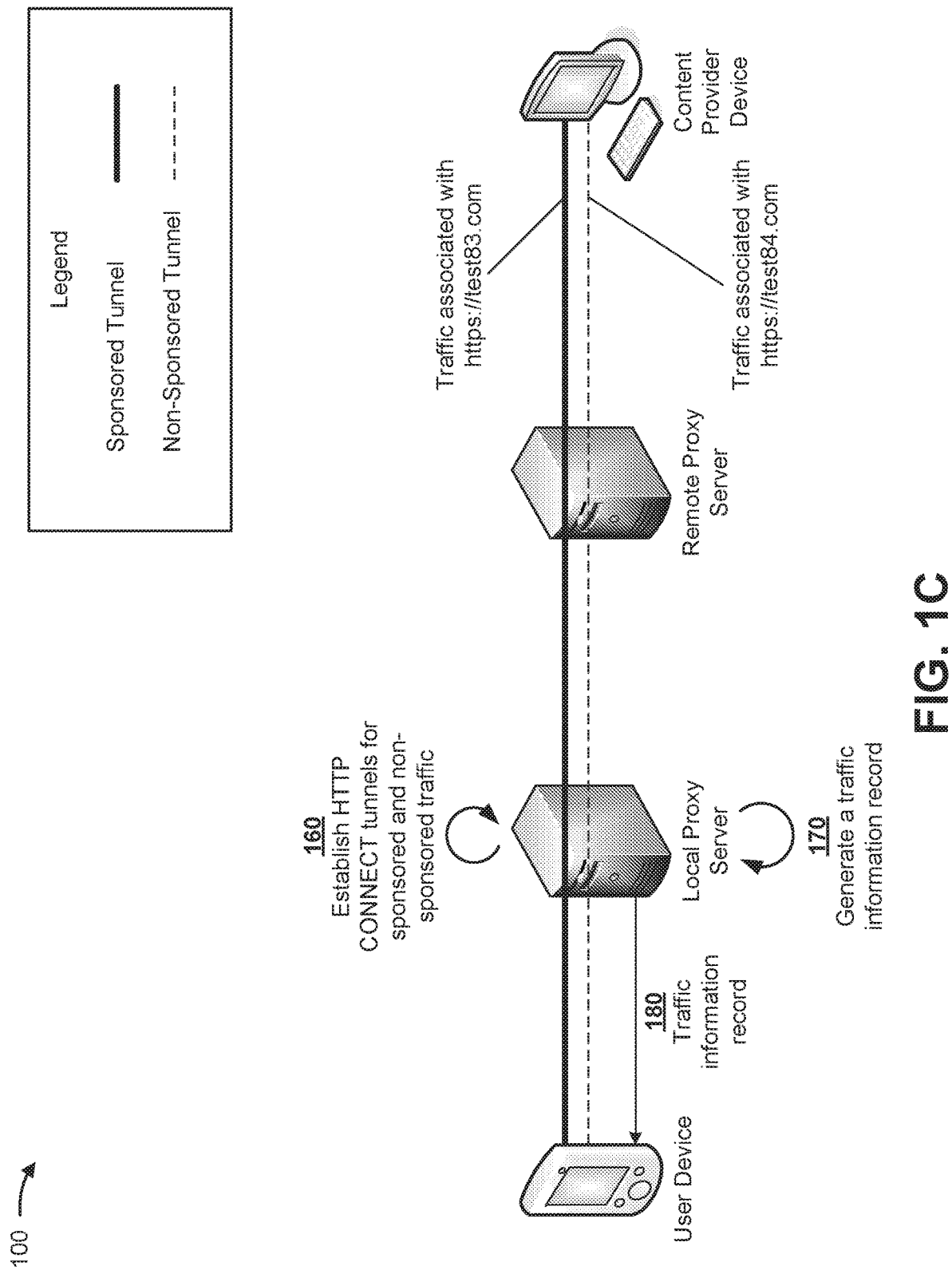

FIGS. 1A-1C are diagrams of an overview of an example implementation 100 described herein. For FIGS. 1A-1C, assume that a content provider creates a campaign associated with a token and one or more sponsored URLs. Further, assume that the token and the one or more sponsored URLs are stored by an authorization device. As shown in FIGS. 1A-1C, the content provider may verify that the campaign is accurately sponsoring data by simulating cellular network data use in a sandbox environment.

As shown in FIG. 1A, and by reference number 110, the simulation may begin when a local proxy server receives an authorization request, from a user device, that includes a token (e.g., shown as token B7214). The token may, for example, identify a sponsored URL associated with the campaign (e.g., the token may identify the sponsored URL https://test83.com). In some implementations, the token may have been previously generated in associated with the creation of the campaign.

As shown by reference numbers 120, the local proxy server may provide the authorization request, that includes the token, to the authorization device, which may trigger the authorization device to send an authorization response, to the local proxy server, that includes the sponsored URL (e.g., https://test83.com). In this case, the authorization device may use the token included in the authorization request to query a data structure of sponsored URLs, and may use the token to search the data structure for a corresponding token, which may be stored in a manner that associates the corresponding token with the sponsored URL. As shown, if the authorization device identifies a token match (e.g., incoming token B7214 matches with stored token B7214), the authorization device may authorize access to the sponsored URL associated with the token match (e.g., https://test83.com) by including the sponsored URL in the authorization response.

As shown by reference number 130, the local proxy server may store the sponsored URL included in the authorization response. For example, the local proxy server may store the sponsored URL using a data structure (e.g., a hash table). By storing the sponsored URL, the local proxy server does not need to query the authorization device for subsequent data use simulations associated with the sponsored URL, thereby conserving processing resources and network resources. After storing the sponsored URL, the local proxy server may send an acknowledgement, to the user device, indicating a status of the authorization request (e.g., the acknowledgement may indicate that the authorization succeeded).

As shown in FIG. 1B, and by reference number 140, the local proxy server may receive, from the user device, a first HTTP CONNECT request that includes a first URL (e.g., https://test83.com), and a second HTTP CONNECT request that includes a second URL (e.g., https://test84.com). The first HTTP CONNECT request and the second HTTP CONNECT request may be sent at different times to verify different campaigns. As shown by reference number 150, the local proxy server may determine whether the URLs are sponsored or non-sponsored. For example, the local proxy server may compare the URLs associated with the HTTP CONNECT requests (e.g., https://test83.com and https://test84.com) to one or more sponsored URLs stored by the data structure. As shown, the local proxy server may determine that the first URL (e.g., https://test83.com) is sponsored and that the second URL (e.g., https://test84.com) is non-sponsored, since the data structure does not store the second URL.

As shown in FIG. 1C, and by reference number 160, the local proxy server may establish an HTTP CONNECT tunnel for the sponsored URL, and may establish an HTTP CONNECT tunnel for the non-sponsored URL. For example, the local proxy server may establish a first HTTP CONNECT tunnel for traffic associated with the first URL (https://test83.com, as shown by the solid line), and may establish a second HTTP CONNECT tunnel for traffic associated with the second URL (https://test84.com, as shown by the dashed line). In this case, the traffic associated with each respective HTTP CONNECT tunnel may be sent between the user device and a content provider device, using the local proxy server and a remote proxy server as intermediaries.

As shown by reference number 170, the local proxy server may generate a traffic information record. For example, the local proxy server may generate a traffic information record by analyzing data use associated with the HTTP CONNECT tunnels. As an example, the local proxy server may analyze data use by monitoring traffic (e.g., counting bytes) sent through the first HTTP CONNECT tunnel associated with the first URL, and this may indicate a total number of bytes consumed by user devices accessing the sponsored URL. In this case, the local proxy server may generate a traffic information record that stores the total number of bytes consumed by user devices accessing the sponsored URL. Similarly, the local proxy server may analyze data use by monitoring traffic that passes through the second HTTP CONNECT tunnel associated with the second URL, and this may indicate a total number of bytes consumed by user devices accessing the non-sponsored URL. In this case, the local proxy server may generate a traffic information record that stores the total number of bytes consumed by user devices accessing the non-sponsored URL.

As shown by reference number 180, the local proxy server may send the traffic information record to the user device to provide the content provider with results of a data use simulation. As an example, assume that a quantity of bytes is consumed via the first HTTP CONNECT tunnel associated with the first URL. In this case, the local proxy server may send a traffic information record that includes byte count information, and the content provider may verify that an account of the content provider is updated appropriately based on the byte count information (e.g., the content provider may verify that the account is updated to show charges corresponding to a particular amount of data use).

By testing data use associated with HTTP CONNECT tunnels, the local proxy server provides a content provider with a tool for verifying the accuracy of data sponsorship campaigns. In this way, the local proxy server prevents data sponsorship errors from occurring during the deployment of the campaign, thereby conserving processing resources and network resources that may otherwise be allocated to correct the data sponsorship errors associated with the campaign.

As indicated above, FIGS. 1A-1C are provided merely as an example. Other examples are possible and may differ from what was described with regard to FIGS. 1A-1C. For example, while the token shown in FIGS. 1A-1C authorizes access to a single URL associated with a single campaign, in some implementations, the token may authorize access to multiple URLs and/or may authorize access to URLs associated with multiple campaigns.

Figure 2:
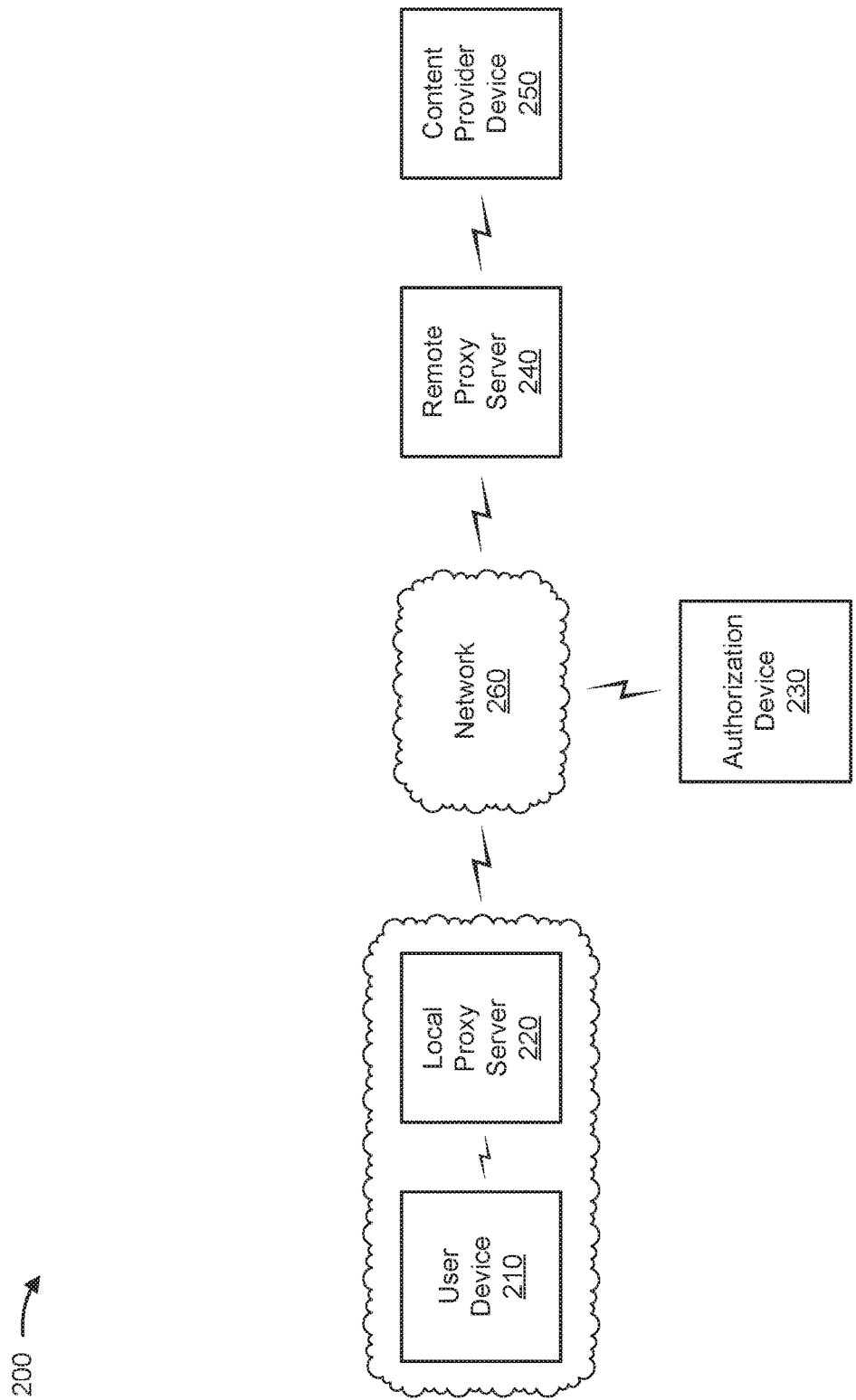
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a local proxy server 220, an authorization device 230, a remote proxy server 240, a content provider device 250, and a network 260. Devices of environment 200 may interconnect via wired connections, wireless connections, or a combination of wired and wireless connections.

User device 210 includes one or more devices capable of communicating with local proxy server 220 and/or a network (e.g., network 260). For example, user device 210 may include a mobile phone, a laptop computer, a tablet computer, a desktop computer, and/or a similar device. In some implementations, user device 210 may execute a program (e.g., an application, a library, an application programming interface (API), a software development kit (SDK), and/or the like) needed to support communications between user device 210 and local proxy server 220. Additionally, or alternatively, user device 210 may execute a sandbox environment used to test toll-free data use, and may test data use by establishing an HTTP CONNECT tunnel between user device 210 and content provider device 250 (e.g., using local proxy server 220 as an intermediary).

Local proxy server 220 includes one or more devices capable of establishing an HTTP CONNECT tunnel and monitoring traffic flow associated with the HTTP CONNECT tunnel. For example, local proxy server 220 may include a server device (e.g., a proxy server), a traffic transfer device (e.g., a router, a switch, a firewall, or the like), a desktop computer, a laptop computer, and/or a similar device. In some implementations, local proxy server 220 may communicate with user device 210 via a local area network (LAN), such as a Wi-Fi network or an Ethernet network. Additionally, or alternatively, local proxy server 220 may store information associated with a toll-free data service campaign by using a data structure. In some cases, local proxy server 220 may be implemented on user device 210 (e.g., one or more functions associated with local proxy server 220 may be implemented on user device 210 by executing a program, such as a script).

Authorization device 230 includes one or more devices capable of generating, receiving, storing, processing, and/or providing information associated with a toll-free data service campaign. For example, authorization device 230 may include a server device, a desktop computer, a laptop computer, and/or a similar device. In some implementations, authorization device 230 may store information associated with the toll-free data service campaign by using a data structure. Additionally, or alternatively, authorization device 230 may send campaign information to and/or receive campaign information from one or more campaign devices. The campaign information may include, for example, a credential (e.g., shown in FIGS. 1A-1C as a token) associated with a campaign, one or more URLs associated with a campaign, or the like.

Remote proxy server 240 includes one or more devices capable of establishing an HTTP CONNECT tunnel and managing traffic flow associated with the HTTP CONNECT tunnel. For example, remote proxy server 240 may include a server device (e.g., a proxy server), a traffic transfer device (e.g., a router, a switch, a firewall, or the like), a desktop computer, a laptop computer, and/or a similar device. In some implementations, remote proxy server 240 may communicate with content provider device 250 via a LAN, such as a Wi-Fi network, and Ethernet network, or the like. In some cases, remote proxy server 240 may be implemented on content provider device 250 (e.g., one or more functions associated with remote proxy server 240 may be implemented on content provider device 250 by executing a program, such as a script).

Content provider device 250 includes one or more devices capable of providing content (e.g., to user device 210). For example, content provider device 250 may include a content server, a host server, a web server, an application server, or the like. In some implementations, content provider device 250 may be associated with a content provider that sponsors a toll-free data service, where the content provider is charged for data usage associated with the toll-free data service rather than an end user associated with user device 210.

Network 260 includes one or more wired and/or wireless networks. For example, network 260 may include a LAN, a wide area network (WAN), a metropolitan area network (MAN), a private network, an ad hoc network, an intranet, the Internet, a fiber optic-based network, a cloud computing network, and/or a combination of these or other types of networks. In some implementations, network 260 may not include a cellular network (e.g., a 5G network, a 4G network, etc.), and instead may include a wired network for simulating data use as if the data were sent over a wireless network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
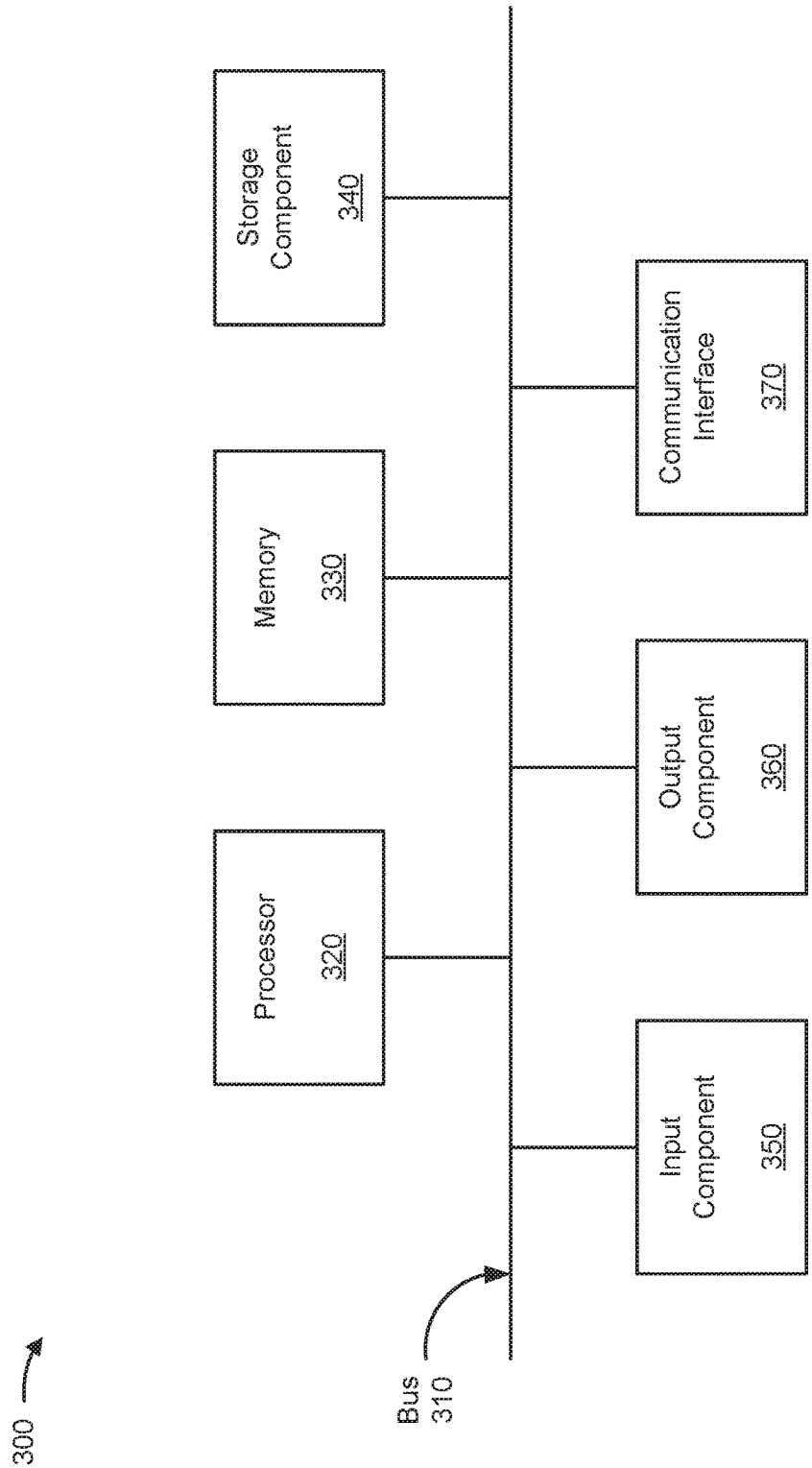
FIG. 3 is a diagram of example components of one or more devices of FIG. 2.

FIG. 3 is a diagram of example components of a device 300. Device 300 may correspond to user device 210, local proxy server 220, authorization device 230, remote proxy server 240, and/or content provider device 250. In some implementations, user device 210, local proxy server 220, authorization device 230, remote proxy server 240, and/or content provider device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
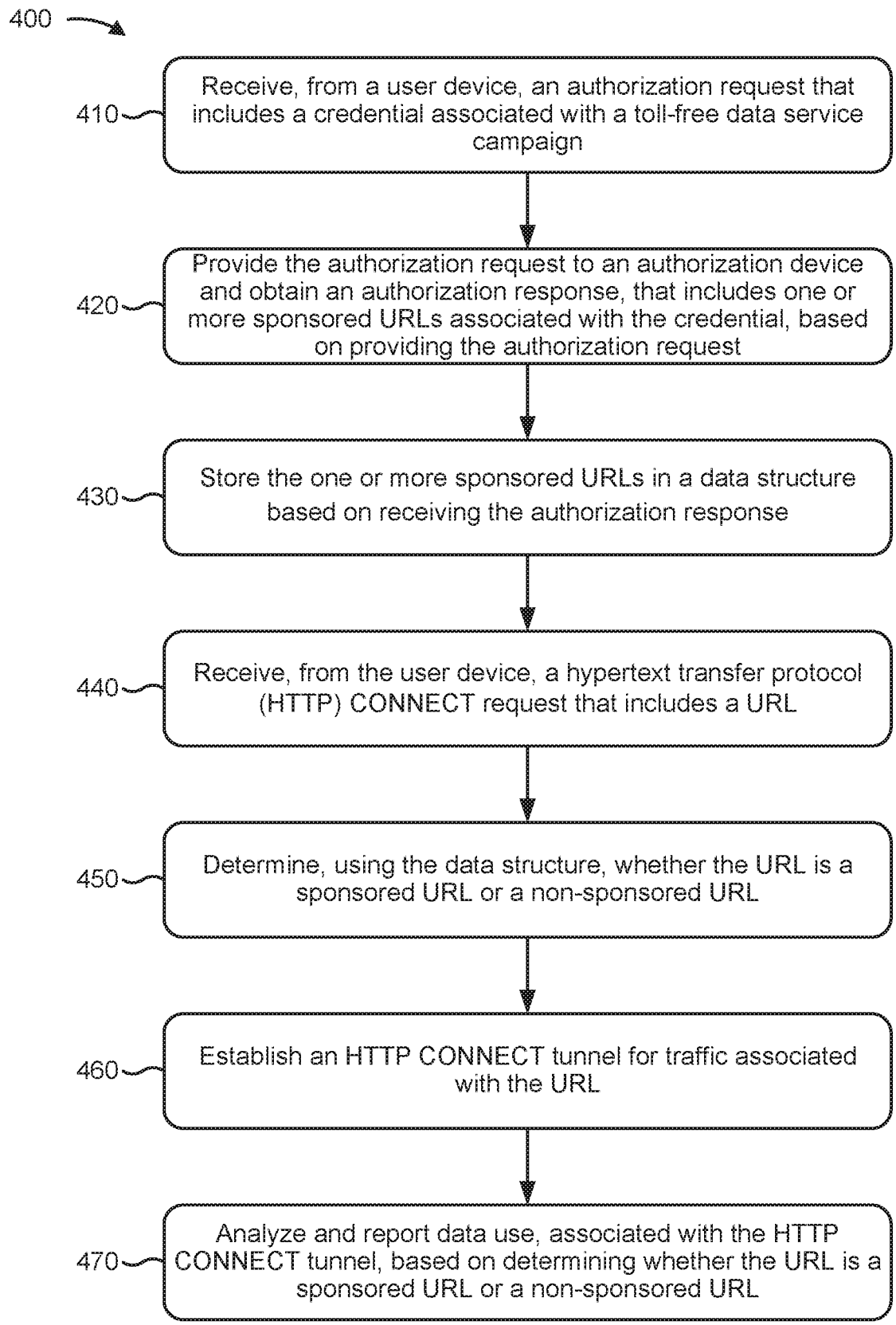
FIG. 4 is a flow chart of an example process for verifying the accuracy of a toll-free data service campaign by simulating data use via an HTTP CONNECT tunnel.

FIG. 4 is a flow chart of an example process 400 for verifying the accuracy of a toll-free data service campaign by simulating data use via an HTTP CONNECT tunnel. In some implementations, one or more process blocks of FIG. 4 may be performed by local proxy server 220. In some implementations, one or more process blocks of FIG. 4 may be performed by another device or a group of devices separate from or including local proxy server 220, such as user device 210, authorization device 230, remote proxy server 240, and/or content provider device 250.

As shown in FIG. 4, process 400 may include receiving, from a user device, an authorization request that includes a credential associated with a toll-free data service campaign (block 410). For example, local proxy server 220 may receive, from user device 210, an authorization request that includes a credential (e.g., a token, a username, a campaign identifier, etc.). The authorization request may be used to request authorization to access sponsored content associated with a campaign. The credential may include a string of characters that identifies the campaign and/or multiple campaigns. Data use associated with the campaign may be tested in a sandbox environment that allows a content provider to simulate data use for the campaign.

In some implementations, prior to local proxy server 220 receiving the authorization request, a content provider may register a campaign that includes campaign information, such as a credential and/or one or more sponsored URLs. For example, a content provider may interact with a campaign input device (e.g., via a web interface) to provide campaign information, and the campaign information may include the credential and/or the one or more sponsored URLs. In some cases, the credential may not be input by the content provider, and instead may be generated automatically as a result of the content provider creating the campaign. The campaign input device may send the campaign information to authorization device 230 (e.g., via one or more other devices). Authorization device 230 may store the campaign information in a manner that associates the credential with the one or more sponsored URLs.

In some implementations, local proxy server 220 may receive an authorization request, from user device 210, as part of a test that simulates data use in a sandbox environment. In this case, user device 210 may be configured to communicate with local proxy server 220 via a LAN (e.g., a local Wi-Fi network), and the sandbox environment that allows a content provider to test data use for the campaign may be implemented via the LAN. The authorization request may include a credential associated with a campaign, and the credential may be used to access one or more sponsored URLs.

As further shown in FIG. 4, process 400 may include providing the authorization request to an authorization device and obtaining an authorization response, that includes one or more sponsored URLs associated with the credential, based on providing the authorization request (block 420). For example, local proxy server 220 may provide the authorization request to authorization device 230, and authorization device 230 may use the credential included in the authorization request to search a data structure for one or more sponsored URLs associated with the credential. If one or more sponsored URLs are found, authorization device 230 may send an authorization response, that includes the one or more sponsored URLs, to local proxy server 220.

In some implementations, local proxy server 220 may provide the authorization request to authorization device 230, and authorization device 230 may use the credential included in the authorization request to query campaign information, such as the one or more sponsored URLs. For example, authorization device 230 may query a data structure that includes active campaigns, and may use the credential to search the data structure, which may be stored with one or more corresponding sponsored URLs.

In some implementations, authorization device 230 may send the authorization response to local proxy server 220. If the authorization succeeds (e.g., the credential in the authorization request matches a corresponding credential stored by the data structure), then local proxy server 220 may receive, from authorization device 230, an authorization response that includes one or more sponsored URLs. If the authorization fails (e.g., the credential in the authorization request does not match a credential stored by the data structure), then local proxy server may 220 receive an indicator that the authorization did not succeed, and may not store any URLs.

As further shown in FIG. 4, process 400 may include storing the one or more sponsored URLs in a data structure based on receiving the authorization response (block 430). For example, local proxy server 220 may receive the authorization response, and may store the one or more sponsored URLs included in the authorization response in a data structure. As an example, the data structure may include a hash table to conserve computing resources. By using the data structure to store one or more sponsored URLs, rather than repeatedly querying authorization device 230 to obtain the one or more sponsored URLs, local proxy server 220 conserves processing resources and network resources.

In some implementations, local proxy server 220 may analyze the authorization response to determine whether to store any URLs in the data structure. For example, if the authorization response includes a success indicator, then local proxy server 220 may store one or more URLs, included in the authorization response, in the data structure. Additionally, or alternatively, if the authorization response includes a particular attribute (e.g., an httpsProxyIP attribute), then local proxy server 220 may store one or more URLs, included in the authorization response, in the data structure.

In some implementations, after storing the one or more sponsored URLs in the data structure, local proxy server 220 may send an acknowledgement to user device 210 indicating the status of the authorization request. For example, local proxy server 220 may send an acknowledgement indicating that the authorization succeeded.

As further shown in FIG. 4, process 400 may include receiving, from the user device, a hypertext transfer protocol (HTTP) CONNECT request that includes a URL (block 440). For example, local proxy server 220 may receive, from user device 210, an HTTP request that includes the URL, as part of a simulation that tests data use associated with the URL. The HTTP request may include, for example, an HTTP GET request, an HTTP CONNECT request, or the like. The URL may include, for example, a host name, a domain name, a web address, and/or the like.

In some implementations, a content provider may test data use associated with the URL by transferring traffic between user device 210 and content provider device 250, over a secured network, via one or more proxy servers (e.g., local proxy server 220 and/or remote proxy server 240). In this case, the content provider may begin testing data use by using user device 210 to send an HTTP CONNECT request to local proxy server 220. The HTTP CONNECT request may include the URL that the content provider is testing.

As further shown in FIG. 4, process 400 may include determining, using the data structure, whether the URL is a sponsored URL or non-sponsored URL (block 450). For example, local proxy server 220 may determine whether the URL, received in association with the HTTP CONNECT request, is a sponsored URL or a non-sponsored URL by comparing the received URL and the one or more sponsored URLs stored by the data structure.

In some implementations, local proxy server 220 may determine whether the received URL is a sponsored or a non-sponsored URL by comparing the received URL and one or more sponsored URLs stored by a hash table (e.g., a hash table using separate chaining, a hash table using open addressing, etc.). For example, the received URL may be hashed (e.g., the URL may be converted to an integer value, a string, etc.), and the resulting hash may be compared to hashed entries (e.g., sponsored URLs) stored by the data structure. By using a hash table, local proxy server 220 efficiently utilizes processing resources when determining whether the received URL is a sponsored URL or a non-sponsored URL.

In some implementations, local proxy server 220 may determine that the received URL is a sponsored URL. For example, local proxy server 220 may compare the received URL to the one or more sponsored URLs stored by the data structure. In this case, local proxy server 220 may determine that the received URL matches a URL of the one or more sponsored URLs stored by the data structure. Local proxy server 220 may determine that the received URL is a non-sponsored URL if the received URL does not match one of the sponsored URLs stored by the data structure.

In some implementations, local proxy server 220 may determine whether the received URL includes a signature, and, if a signature is not found, local proxy server 220 may compare the received URL to the one or more sponsored URLs stored by the data structure. For example, local proxy server 220 may analyze the received URL to determine whether the received URL includes a signature, such as a string of characters appended to the end of the URL. If the received URL includes the signature, local proxy server 220 may determine that the received URL is a sponsored URL. If the received URL does not include the signature, local proxy server 220 may compare the received URL to the one or more sponsored URLs stored by the data structure. If the received URL matches with one of the sponsored URLs stored by the data structure, local proxy server 220 may determine that the received URL is a sponsored URL based on a result of the comparing. If the received URL does not match with one of the sponsored URLs stored by the data structure, local proxy server 220 may determine that the received URL is a non-sponsored URL based on a result of the comparing. In this way, local proxy server 220 efficiently utilizes network resources by querying the data structure when the URL does not include the signature, and by not querying the data structure when the URL does include the signature.

By differentiating between HTTP requests that include a sponsored URL and HTTP requests that include a non-sponsored URL, local proxy server 220 is able to establish HTTP tunnels that differentiate between sponsored and non-sponsored traffic.

As further shown in FIG. 4, process 400 may include establishing an HTTP CONNECT tunnel for traffic associated with the URL (block 460). For example, local proxy server 220 may establish an HTTP CONNECT tunnel that allows a content provider to simulate data use associated with the received URL. In this case, local proxy server 220 may store an indication that traffic passing through the HTTP CONNECT tunnel is sponsored or non-sponsored.

In some implementations, local proxy server 220 may establish an HTTP CONNECT tunnel that allows traffic to flow between user device 210 and content provider device 250, using local proxy server 220 and/or remote proxy server 240 as intermediaries. For example, local proxy server 220 may receive traffic (e.g., packets) from user device 210, associated with transmission control protocol (TCP)/internet protocol (IP), and may encapsulate the packets with an HTTP protocol. After encapsulating the packets with the HTTP protocol, local proxy server 220 may use the HTTP CONNECT method to send the packets to remote proxy server 240. Remote proxy server 240 may decapsulate the packets and send the decapsulated packets to content provider device 250. Packets may be sent from content provider device 250 to user device 210 in the reverse manner.

Additionally, or alternatively, local proxy server 220 may store an indication that traffic passing through the HTTP CONNECT tunnel is sponsored or non-sponsored. For example, local proxy server 220 may, for an established HTTP CONNECT tunnel (e.g., a tunnel associated with a sponsored URL, a tunnel associated with a non-sponsored URL, etc.), store an indication that traffic is sponsored or non-sponsored by storing a byte count total for traffic passing through the HTTP CONNECT tunnel. In this case, local proxy server 220 may count bytes passing through the HTTP CONNECT tunnel, and may store a total to indicate the total quantity of bytes used in association with the HTTP CONNECT tunnel. In some cases, separate HTTP CONNECT tunnels may be established for two different URLs that are both sponsored, which may result in separate indications that traffic is sponsored (e.g., separate byte counts).

As an example, if local proxy server 220 determines that the received URL is a sponsored URL, local proxy server 220 may establish an HTTP CONNECT tunnel for traffic associated with the sponsored URL, and may store an indication that traffic passing through the HTTP CONNECT tunnel is sponsored (e.g., by storing a byte count total). As another example, if local proxy server 220 determines that the received URL is a non-sponsored URL, local proxy server 220 may establish a different HTTP CONNECT tunnel for traffic associated with the non-sponsored URL, and may store a different indication that traffic passing through the HTTP CONNECT tunnel is non-sponsored (e.g., by storing a different byte count total). By establishing different HTTP CONNECT tunnels and/or different indications for sponsored and non-sponsored URLs, local proxy server 220 tests situations where an account of a content provider should be updated (e.g., for data use associated with a sponsored URL), and tests situations where an account of a content provider should not be updated (e.g., for data use associated with a non-sponsored URL).

As further shown in FIG. 4, process 400 may include analyzing and reporting data use, associated with the HTTP CONNECT tunnel, based on determining whether the URL is a sponsored URL or a non-sponsored URL (block 470). For example, local proxy server 220 may analyze data use associated with HTTP CONNECT tunnel by monitoring data use (e.g., bytes) sent and/or received via the HTTP CONNECT tunnel, and/or by generating a traffic information record based on monitoring the data use. Local proxy server 220 may report data use by sending the traffic information record to user device 210. The traffic information record may include information identifying a campaign (e.g., a campaign identifier, a campaign owner identifier, etc.), information indicating a quantity of sponsored traffic or a quantity of non-sponsored traffic used for an individual URL and/or an individual HTTP CONNECT tunnel, information indicating a total quantity of sponsored traffic or a total quantity of non-sponsored traffic used by multiple URLs and/or multiple HTTP CONNECT tunnels (e.g., by aggregating data between multiple URLs and/or HTTP CONNECT tunnels), or the like.

In some implementations, local proxy server 220 may track data use by monitoring traffic (e.g., bytes) transferred between user device 210 and content provider device 250 using the HTTP CONNECT tunnel. For example, local proxy server 220 may monitor bytes transferred via the HTTP CONNECT tunnel, and local proxy server 220 may use the bytes transferred to generate a traffic information record that indicates a total quantity of resources (e.g., a total quantity of bytes) transferred via the HTTP CONNECT tunnel.

As an example, assume local proxy server 220 determines the received URL is a sponsored URL and establishes an HTTP CONNECT tunnel for data use associated with the sponsored URL. Here, local proxy server 220 may monitor and/or analyze data use associated with the HTTP CONNECT tunnel by counting a quantity of bytes of traffic that pass through the HTTP CONNECT tunnel. In this case, local proxy server 220 may generate a traffic information record that indicates the quantity of bytes as sponsored data. When local proxy server 220 determines the received URL is a non-sponsored URL, local proxy server 220 may use a similar process to generate a traffic information record that indicates the quantity of bytes as non-sponsored data.

In some implementations, local proxy server 220 may generate a traffic information record that aggregates byte count information from multiple HTTP CONNECT tunnels. For example, assume local proxy server 220 generates a traffic information record for an HTTP CONNECT tunnel associated with a first sponsored URL, and generates a different traffic information record for a different HTTP CONNECT tunnel associated with a second sponsored URL. In this case, local proxy server 220 may aggregate byte count information associated with the traffic information record and the different traffic information record to obtain a total byte count of sponsored data. Here, local proxy server 220 may indicate the aggregate byte count information in the total traffic information record.

In some implementations, local proxy server 220 may generate and use an artificial intelligence model to determine if a campaign being tested includes errors, and local proxy server 220 may automatically send error correction information to one or more devices that store campaign information (e.g., a campaign storage device, a campaign management device, a campaign enforcement device, etc.) to correct the errors. For example, local proxy server 220 may generate an artificial intelligence model that stores past data use simulation records, and local proxy server 220 may use the past data use simulation records to determine if a present data use simulation includes an error. In this case, local proxy server 220 may correct the error automatically by sending error correction information to one or more devices that store campaign information.

In this way, local proxy server 220 provides a content provider with data use information relating to the campaign, which conserves processing resources by allowing the content provider to fix any existing errors prior to deployment of the campaign. Furthermore, allowing the content provider to verify the status of the campaign improves customer satisfaction by providing the content provider with reassurance that data use charges associated with the campaign are being accurately applied.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By accurately identifying sponsored and non-sponsored traffic via an HTTP CONNECT tunnel, local proxy server 220 provides a content provider with a tool for verifying the accuracy of a toll-free data campaign. In this way, local proxy server 220 prevents data sponsorship errors from occurring when the campaign is deployed, thereby conserving processing resources and network resources that may otherwise be allocated to correct errors associated with the deployed campaign.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive, from a user device associated with a content provider and for a data use simulation, an authorization request that includes a token associated with a toll-free data service campaign;
obtain an authorization response based on providing the authorization request to an authorization device,
the authorization response including one or more sponsored URLs associated with the toll-free data service campaign;
store the one or more sponsored URLs in a data structure based on the authorization response;
send an acknowledgement to the user device indicating a status of the authorization request;
receive, from the user device and as part of the data use simulation to test data use, a hypertext transfer protocol (HTTP) CONNECT request that includes a uniform resource locator (URL);
determine, using the data structure, whether the URL is a sponsored URL, associated with a toll-free data service campaign, or a non-sponsored URL,
the data structure including the one or more sponsored URLs, and
the URL being a sponsored URL when the URL includes a signature appended to an end of the URL;
establish an HTTP CONNECT tunnel for transferring traffic, associated with the URL, between the user device and the content provider in a restricted operating system environment to verify accuracy of the toll-free data service campaign;
analyze data use, associated with the HTTP CONNECT tunnel, based on determining whether the URL is a sponsored URL or a non-sponsored URL;
generate a traffic information record based on analyzing the data use;
provide the traffic information record to the user device,
the traffic information record being used to verify whether the content provider is correctly charged for the data use by the user device;
generate, based on the data use simulation, a model to determine that the toll-free data service campaign includes one or more errors; and
automatically send error correction information to one or more devices that store information associated with the toll-free data service campaign based on determining that the toll-free data service campaign includes the one or more errors.

2. The device of claim 1, where the URL identifies a domain name or a host name associated with the toll-free data service campaign.

3. The device of claim 1, where the one or more processors, when determining whether the URL is a sponsored URL or a non-sponsored URL, are to:
compare the URL and the one or more sponsored URLs stored by the data structure; and
determine whether the URL is a sponsored URL or a non-sponsored URL based on a result of the comparing.

4. The device of claim 1, where the one or more processors, when determining whether the URL is a sponsored URL or a non-sponsored URL, are to:
determine that the URL is a sponsored URL; and
where the one or more processors, when analyzing data use associated with the HTTP CONNECT tunnel, are to:
count a quantity of bytes of traffic that pass through the HTTP CONNECT tunnel;
and
where the one or more processors, when generating the traffic information record, are to:
indicate the quantity of bytes as sponsored data in the traffic information record.

5. The device of claim 1, where the one or more processors, when determining whether the URL is a sponsored URL or a non-sponsored URL, are to:
determine that the URL is a non-sponsored URL; and
where the one or more processors, when analyzing data use associated with the HTTP CONNECT tunnel, are to:
count a quantity of bytes of traffic that pass through the HTTP CONNECT tunnel;
and
where the one or more processors, when generating the traffic information record, are to:
indicate the quantity of bytes as non-sponsored data in the traffic information record.

6. The device of claim 5, where the one or more processors, when generating the traffic information record associated with the HTTP CONNECT tunnel, are further to:
generate a different traffic information record associated with a different HTTP CONNECT tunnel;
aggregate byte count information from the traffic information record and the different traffic information record; and
indicate the aggregate byte count information in a total traffic information record.

7. The device of claim 1, where the one or more processors are further to:
determine whether the authorization response includes a success indicator; and
where the one or more processors, when storing one or more sponsored URLs in the data structure, are to:
store the one or more sponsored URLs in the data structure based on determining that the authorization response includes the success indicator.

8. A non-transitory computer-readable medium storing instructions, the instructions comprising:
one or more instructions that, when executed by one or more processors, cause the one or more processors to:
receive, from a user device associated with a content provider and for a data use simulation, an authorization request that includes a token associated with a toll-free data service campaign;

obtain an authorization response based on providing the authorization request to an authorization device,
the authorization response including one or more sponsored URLs associated with the toll-free data service campaign; and
store the one or more sponsored URLs in a data structure based on the authorization response;
send an acknowledgement to the user device indicating a status of the authorization request;
receive, from the user device and as part of the data use simulation to test data use, a hypertext transfer protocol (HTTP) CONNECT request that includes a uniform resource locator (URL);
determine, using the data structure, whether the URL is a sponsored URL or a non-sponsored URL,
the data structure including the one or more sponsored URLs, and
the URL being a sponsored URL when the URL includes a signature appended to an end of the URL;
establish an HTTP CONNECT tunnel for transferring traffic, associated with the URL, between the user device and the content provider in a restricted operating system environment to verify accuracy of the toll-free data service campaign;
monitor data use, associated with the HTTP CONNECT tunnel, based on determining whether the URL is a sponsored URL or a non-sponsored URL;
generate a traffic information record based on monitoring the data use;
provide the traffic information record to the user device,
the traffic information record being used to verify whether the content provider is correctly charged for the data use by the user device;
generate, based on the data use simulation, a model to determine that the toll-free data service campaign includes one or more errors; and
automatically send error correction information to one or more devices that store information associated with the toll-free data service campaign based on determining that the toll-free data service campaign includes the one or more errors.

9. The non-transitory computer-readable medium of claim 8, where the one or more instructions, that cause the one or more processors to determine whether the URL is a sponsored URL or a non-sponsored URL, cause the one or more processors to:
determine that the URL matches a URL of the one or more sponsored URLs stored by the data structure; and
determine that the URL is a sponsored URL based on determining that the URL matches the URL of the one or more sponsored URLs stored by the data structure.

10. The non-transitory computer-readable medium of claim 9, where the one or more instructions, that cause the one or more processors to monitor data use associated with the HTTP CONNECT tunnel, cause the one or more processors to:
count a quantity of bytes of traffic that pass through the HTTP CONNECT tunnel; and
where the one or more instructions, that cause the one or more processors to generate the traffic information record, cause the one or more processors to:
indicate the quantity of bytes as sponsored data in the traffic information record.

11. The non-transitory computer-readable medium of claim 8, where the one or more instructions, that cause the one or more processors to determine whether the URL is a sponsored URL or a non-sponsored URL, cause the one or more processors to:
determine that the URL does not match a URL of the one or more sponsored URLs stored by the data structure; and
determine that the URL is a non-sponsored URL based on determining that the URL does not match the URL of the one or more sponsored URLs stored by the data structure.

12. The non-transitory computer-readable medium of claim 11, where the one or more instructions, that cause the one or more processors to monitor data use associated with the HTTP CONNECT tunnel, cause the one or more processors to:
count a quantity of bytes that pass through the HTTP CONNECT tunnel; and
where the one or more instructions, that cause the one or more processors to generate the traffic information record, cause the one or more processors to:
indicate the quantity of bytes as non-sponsored data in the traffic information record.

13. The non-transitory computer-readable medium of claim 8, where the one or more instructions, that cause the one or more processors to generate the traffic information record, further cause the one or more processors to:
generate a different traffic information record associated with a different HTTP CONNECT tunnel;
aggregate byte count information from the traffic information record and the different traffic information record; and
indicate the aggregate byte count information in a total traffic information record.

14. The non-transitory computer-readable medium of claim 8, where the one or more instructions, when executed by the one or more processors, further cause the one or more processors to:
determine whether the authorization response includes a success indicator; and
where the one or more instructions, that cause the one or more processors to store the one or more sponsored URLs in the data structure, cause the one or more processors to:
store the one or more sponsored URLs in the data structure based on determining that the authorization response includes the success indicator.

15. A method, comprising:
receiving, by a device and from a user device associated with a content provider and for a data use simulation, an authorization request that includes a token associated with a toll-free data service campaign;
obtaining, by the device, an authorization response based on providing the authorization request to an authorization device,
the authorization response including one or more sponsored URLs associated with the toll-free data service campaign; and
storing, by the device, the one or more sponsored URLs in a data structure based on the authorization response;
sending, by the device, an acknowledgement to the user device indicating a status of the authorization request;
receiving, by the device and as part of the data use simulation to test data use, a hypertext transfer protocol (HTTP) CONNECT request, from the user device,
the HTTP CONNECT request including a uniform resource locator (URL);

determining, by the device and using the data structure, whether the URL is a sponsored URL or a non-sponsored URL,
  the data structure including the one or more sponsored URLs, and
  the URL being a sponsored URL when the URL includes a signature appended to an end of the URL;
establishing, by the device, an HTTP CONNECT tunnel for transferring traffic, associated with the URL, between the user device and the content provider in a restricted operating system environment to verify accuracy of the toll-free data service campaign;
analyzing, by the device, data use associated with the HTTP CONNECT tunnel;
generating, by the device, a traffic information record based on analyzing the data use;
providing, by the device, the traffic information record to the user device,
  the traffic information record being used to verify whether the content provider is correctly charged or the data use by the user device;
generating, by the device and based on the data use simulation, a model to determine that the toll-free data service campaign includes one or more errors; and
automatically sending, by the device, error correction information to one or more devices that store information associated with the toll-free data service campaign based on determining that the toll-free data service campaign includes the one or more errors.

16. The method of claim 15, where determining whether the URL is a sponsored URL or a non-sponsored URL comprises:
  determining that the URL includes the signature that indicates that the URL is a sponsored URL;
  determining, based on determining that the URL includes the signature, that the URL matches the URL of the one or more sponsored URLs stored by the data structure; and
  determining that the URL is a sponsored URL based on determining that the URL matches a URL of the one or more sponsored URLs stored by the data structure.

17. The method of claim 16, where analyzing data use associated with the HTTP CONNECT tunnel comprises:
  counting a quantity of bytes that pass through the HTTP CONNECT tunnel; and
  where generating the traffic information record comprises:
    indicating the quantity of bytes as sponsored data in the traffic information record.

18. The method of claim 15, where generating the traffic information record comprises:
  determining that the URL does not include the signature indicating that the URL is a sponsored URL;
  determining that the URL does not match a URL of the one or more sponsored URLs stored by the data structure; and
  determining that the URL is a non-sponsored URL based on determining that the URL does not match the URL of the one or more sponsored URLs stored by the data structure.

19. The method of claim 18, where analyzing data use associated with the HTTP CONNECT tunnel comprises:
  counting a quantity of bytes that pass through the HTTP CONNECT tunnel; and
  where generating the traffic information record, comprises:
    indicating the quantity of bytes as non-sponsored data in the traffic information record.

20. The method of claim 15, further comprising:
determining whether the authorization response includes a success indicator; and
where storing the one or more sponsored URLs in the data structure comprises:
  storing the one or more sponsored URLs in the data structure based on determining that the authorization response includes the success indicator.

* * * * *